Sept. 5, 1967     P. C. TREXLER     3,339,992
ISOLATOR METHOD AND APPARATUS
Filed Aug. 27, 1964     3 Sheets-Sheet 1
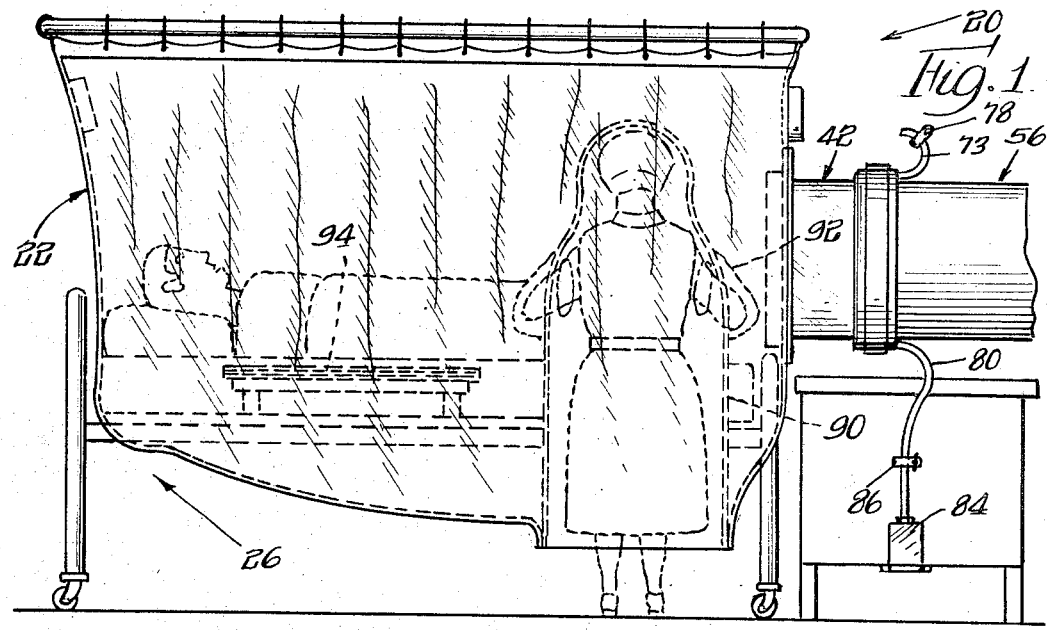
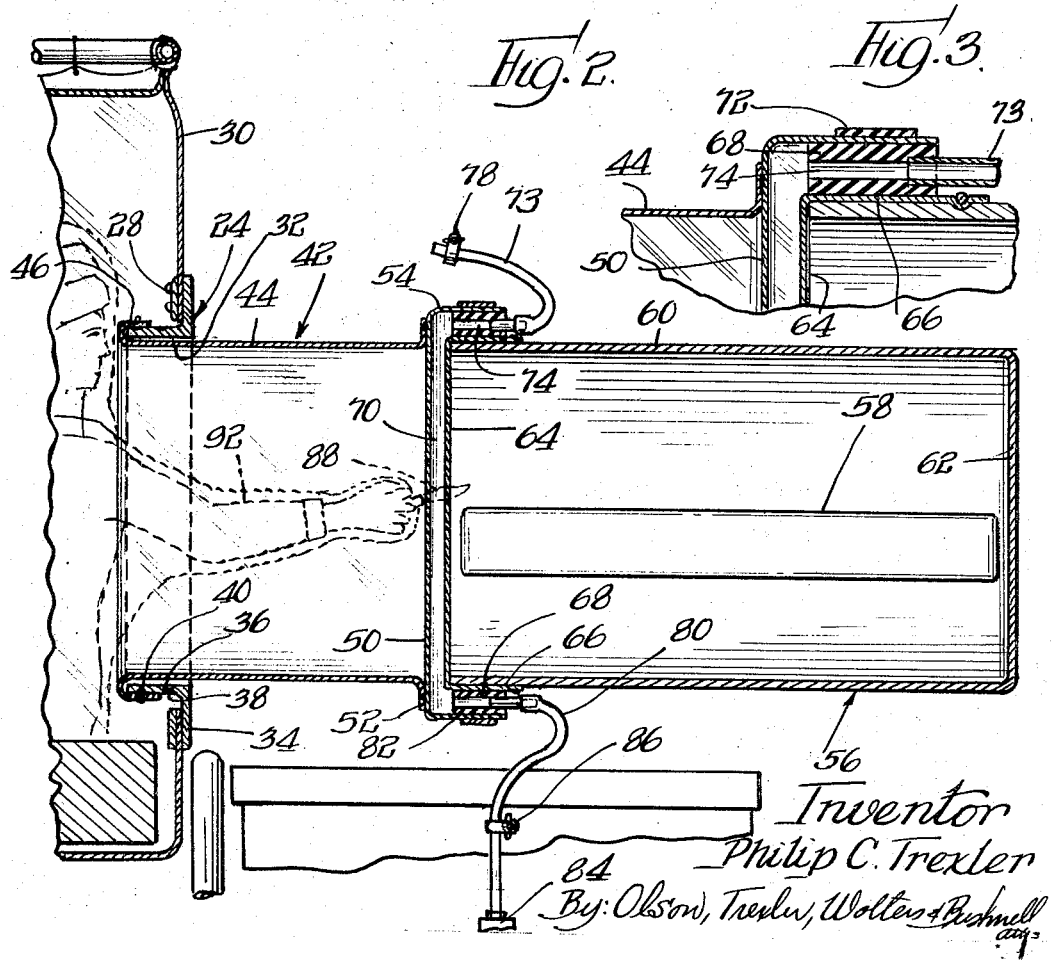
Inventor
Philip C. Trexler
By: Olson, Trexler, Wolters & Bushnell
attys

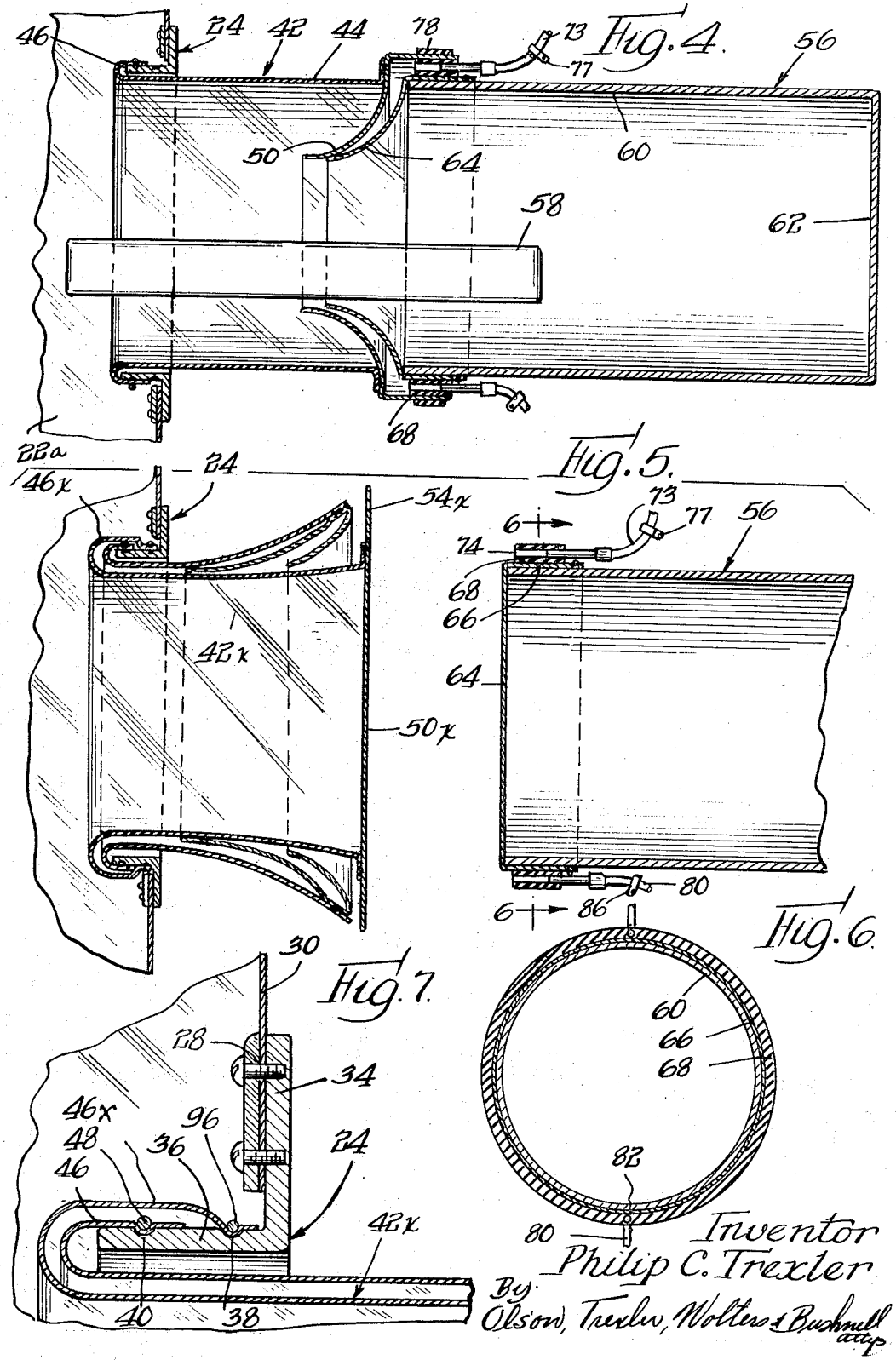

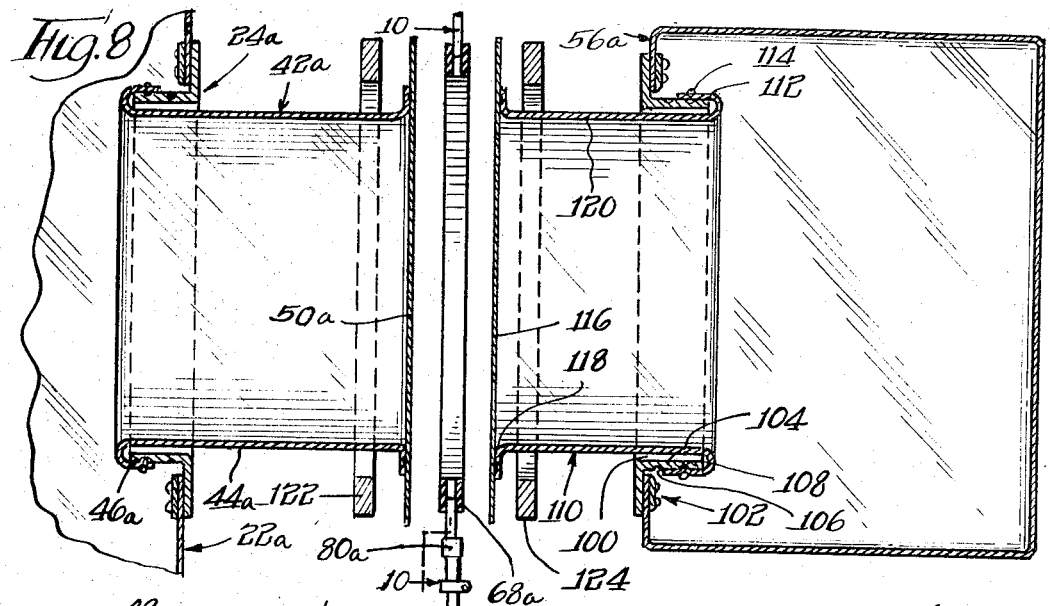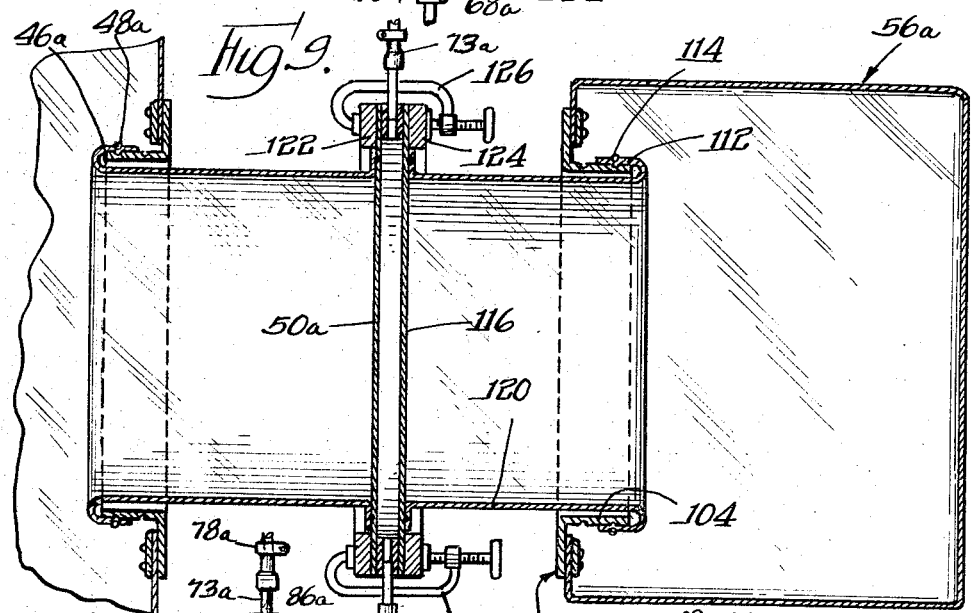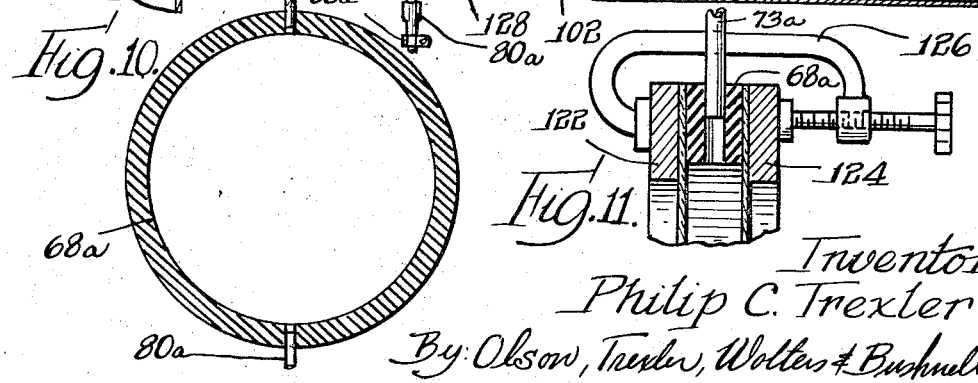

United States Patent Office 3,339,992
Patented Sept. 5, 1967

3,339,992
ISOLATOR METHOD AND APPARATUS
Philip C. Trexler, Stoneham, Mass., assignor to Snyder Manufacturing Company, Inc., New Philadelphia, Ohio, a corporation of Ohio
Filed Aug. 27, 1964, Ser. No. 392,505
13 Claims. (Cl. 312—3)

ABSTRACT OF THE DISCLOSURE

There is disclosed a method and structure for establishing communication between two isolators, which structure includes severable diaphragms covering openings in each isolator and adapted to be secured together so that a decontaminating susbtance may be introduced into the space between opposing surfaces of the diaphragms whereupon the diaphragms may be severed to provide access between the isolators.

---

The present invention relates to a novel isolator structure, and more specifically to a novel method and apparatus for maintaining an isolated environment while permitting ingress and egress at the same time preventing contaminants from entering the isolated area.

A variety of needs have arisen in medical, animal husbandry and certain industrial activities for the establishment and maintenance of a germ-free or otherwise uncontaminated and controlled environment within an enclosure. At the same time it is necessary to permit entry into and exit from the enclosure without enabling contaminants from entering the enclosure.

It is an important object of the present invention to provide a novel method and means for maintaining an isolated environment free of contamination while permitting entry thereto relatively quickly, easily and economically and without permitting the transfer of contaminants between the isolated environment and the surrounding atmosphere.

A more specific object of the present invention is to provide an isolator structure with novel means for enabling any desired article, material, or supplies to be easily and efficiently transferred between the interior of an isolator and a container or another isolator while preventing contaminants from entering the isolator.

Other objects and advantages of the present invention will become apparent from the following description and the accompanying drawings wherein:

FIG. 1 is a side elevational view showing an isolator structure incorporating features of the present invention;

FIG. 2 is an enlarged fragmentary partial sectional view showing means constructed in accordance with features of the present invention for accomplishing entry into the isolator;

FIG. 3 is an enlarged fragmentary sectional view showing a portion of the structure in greater detail;

FIGS. 4 and 5 are sectional views similar to FIG. 2 and show successive steps in the method of transferring an article between the exterior and interior of the isolator in accordance with the present invention;

FIG. 6 is a sectional view taken along line 6—6 in FIG. 5;

FIG. 7 is an enlarged fragmentary sectional view of a portion of the structure in FIG. 5 in order to show certain features in greater detail;

FIG. 8 is a fragmentary sectional view of a modified form of the present invention and showing parts thereof positioned to be assembled together;

FIG. 9 is a fragmentary sectional view similar to FIG. 8 and further showing the parts in similar condition;

FIG. 10 is a sectional view taken along line 10—10 in FIG. 9; and

FIG. 11 is an enlarged fragmentary sectional view similar to FIG. 8 and showing features of the structure in greater detail.

Referring now more specifically to the drawings wherein like parts are designated by the same numerals throughout the various figures, an isolator structure 20 incorporating features of the present invention comprises an enclosure 22. It is to be understood that a variety of enclosures may be used in accordance with the needs of a particular installation, but in each instance the enclosure has an access port 24. In the embodiment shown, the enclosure 22 is in the form of a plastic bag-like structure adapted to be associated with a hospital bed 26 for isolating a patient on the bed from the surrounding atmosphere. As will be understood, there are many instances when it is desired to prevent germs or other contaminants in the surrounding atmosphere from entering the enclosure 22.

The access port 24 is a relatively rigid and self-supporting member which is secured and sealed as at 28 to an end wall 30 of the enclosure structure 22. The port member 24 defines an opening 32 through the wall 30, which opening is large enough to permit food and other supplies to be delivered into the enclosure and material to be removed from the enclosure. Furthermore, it is contemplated that in certain instances the patient may even be moved into and out of the enclosure through the opening 32.

The port 24 has a radially extending annular section 34 which is secured to the wall 30. In addition, the port member is provided with an axially inwardly extending annular flange 36. Annular grooves 38 and 40 are formed in an exterior surface of the flange 36 and in axially spaced relationship as shown best in FIG. 7 for a purpose described below.

In order to seal the access opening 32, a closure member 42 is constructed in accordance with the features of the present invention is provided. The closure member 42 comprises a tubular section 44 formed from sheet material and preferably from plastic. An inner end marginal portion 46 of the tubular member 44 is adapted to be turned outwardly and reversely and assembled over the flange 36 of the port member 24 as shown in FIGS. 2, 4, 5 and 7. An elastic band 48 is assembled around the marginal portion 46 and engages in the groove 40 for securing and sealing the marginal portion of the closure member to the port member.

The internal dimensions of the tubular member 44 are approximately the same as those of the opening 32 and the tubular member extends outwardly a suitable distance through the opening 32 and away from the adapter or port member 24. An outer end of the tubular member 44 is closed by a generally flat transverse diaphragm wall 50 which is also formed from a sheet material and preferably from the same sheet material as the tubular member 44. The end wall or membrane 50 is sealed to an outer end of the tubular member 44 as at 52. The membrane or end wall 50 has an annular marginal or flange portion 54 extending outwardly from the seal 52, which flange portion may initially be in the same plane as the remainder of the end wall 50 as indicated in FIG. 5 and is adapted to be folded to a generally axially extending position or it may initially be formed in such a position for the purposes described below.

The apparatus contemplates the provision of a container 56 which may be made from metal or any other desired material. The container s of a suitable size and shape for receiving an article 58 which is to be moved into the enclosure structure 22. The container comprises a self-supporting generally cylindrical wall 60 and an end member 62 secured and sealed to an outer end of the wall 60. An opposite end of the container is initially closed and sealed by a diaphragm or membrane 64 formed from sheet material and preferably a plastic material. A marginal portion 66 of the membrane 64 is folded around the adjacent end of the container wall 60 and is secured and sealed thereto by an elastic band or other clamping ring 68.

When it is desired to transfer the article 58 from the container 56 to the interior of the enclosure structure 22, the container is positioned as shown in FIGS. 1–3 with the end membrane 64 thereof in alignment with and adjacent to the end membrane 50 of the closure member 42. However, the container is positioned so as to leave a small space 70 between the membranes or diaphragms 50 and 64. Then the peripheral portion 54 of the diaphragm 50 is positioned over the elastic member or clamping ring 68 and is secured and sealed thereto by an elastic band 72 as shown in FIGS. 2–4.

The membranes 50 and 64 are adapted to be cut in the manner described more fully below in order to permit the article 58 to be passed through the opening 32. However, before the membranes are cut, care is taken to sterilize or decontaminate their opposing surfaces, which surfaces are exposed to the surrounding atmosphere prior to assembly of the container with the closure member 42.

In order to introduce a sterilizing or decontaminating medium into the space 70 and thereby decontaminate the opposing surfaces of the diaphragms 50 and 64, an inlet tube 80 is connected with a passageway 82 extending through the relatively thick elastic or clamping band 68. The tube 80 is also connected with a container 84 or any other suitable source of supply for the sterilizing or decontaminating fluid. A hose clamp 86 is positioned on the tube 80 for controlling the flow of fluid. It is contemplated that the bottle 84 or other source of supply should be capable of delivering sufficient gas or liquid so as to fill the space 70 completely and thereby insure complete sterilization of the membranes or diaphragms 50 and 64. Furthermore the bottle may be manually raised to an elevated position for filling the space 70 and then lowered to the position shown for draining the space.

A vent tube 73 is connected with another passageway 74 through the band 68, which passageway is located at the upper side of the band. The tube 73 has another hose clamp 78 positioned thereon. The hose clamp 78 is opened during filling of the space to permit all of the air to be forced from the space 70. Then the clamp 78 is closed.

After the space 70 has been filled with the sterilized liquid and the sterilizing operation has been completed, the upper clamp 78 is maintained closed and the other clamp 86 is open and the bottle 84 is moved to its lowered position. This permits the liquid to drain from the space 70 and at the same time draw a vacuum in space 70 so that the diaphragms 50 and 64 are forced together. This not only assures complete draining of the space but also enables the connection between the container 60 and the enclosure member 22 to be checked for leaks. Of course, when the draining operation is completed the clamp 86 is closed.

After the membranes or diaphragms 50 and 64 have been sterilized, a knife 88 or other suitable instrument is employed for severing the membranes as indicated in FIG. 2. The knife is maintained in a sterile condition within the enclosure structure 22 and may be grasped by an attendant through a flexible wall of the enclosure structure and manipulated in the desired manner. Preferably the enclosure structure 22 is formed with an integral jacket portion 90 having an arm and glove section 92 as shown in FIGS. 1 and 2 so as to enable an attendant not only to manipulate the knife 88 but also to reach into the container and extract the article 58 and otherwise administer to the patient in the enclosure structure. It is, however, contemplated that, if desired, the arm and glove section 92 could be formed integrally with the tubular member 44.

It is contemplated that after the contents of the container 60 have been removed, the access opening 32 may be resealed so as to enable the container to be withdrawn and for preparing the apparatus for receiving material from another container. More specifically, it is contemplated that a supply 94 of the closure member 42 may be maintained in a sterile condition within the enclosure structure 22 and shown at FIG. 1. Prior to removal of the container 56, an attendant removes a closure member designated 42x in FIGS. 5 and 7 from a supply pile and assembles the marginal portion 46x of the closure member 42x over the flange 36 and the marginal portion 46 of the original enclosure member. As shown best in FIG. 7, the marginal portion 46x is extended over the flange until it overlaps the groove 38 and it is secured in the groove 38 by an additional elastic band 96. The original closure member 42 may then be pulled outwardly from the flange 36 of the port member whereupon the closure member 42x may be extended to the position shown in FIG. 5. It will be appreciated that after the original closure member 42 has been removed the marginal portion 46x and the elastic band 96 may be adjusted for engagement with the groove 40 in order to clear the groove 38 for accommodating another closure member after the steps of removing an article from another container have been completed. Of course, whenever necessary, the supply of closure members and elastic bands within the enclosure structure may be replenished by introducing the desired items in a sterilized condition from another container.

FIGS. 7 through 10 show a modified form of the present invention which is similar to the structure described above as indicated by the application of identical reference numerals with the suffix *a* to corresponding elements.

In this embodiment the container or enclosure 56a may be formed of self-supporting metal or other material or may be formed by a flexible sheet of plastic or other suitable material. Furthermore, the container or enclosure 56a may be identical to the enclosure or isolator 22a. In any event the enclosure 56a is formed with an access opening 100 which is defined by a port member 102. The port member 102 is essentially identical to but oppositely disposed from the port 24a. Thus the port member 102 has an axially inwardly extending flange 104 formed with axially spaced annular grooves 106 and 108. The container 56a is normally sealed by a closure member 110 which is identical to the closure member 42a and has a marginal portion 112 secured to the flange 104 by an elastic band 114. An outer end of the closure member 110 is closed by a membrane or diaphragm 116 which is sealed as at 118 to a tubular body 120 of the closure member.

In order to connect the container or enclosure 56a with the enclosure 22a, the outer ends of the closure members 42a and 110 are brought into alignment and adjacent relationship as shown in FIG. 7, and a radially extending gasket 68a is positioned therebetween. The gasket 68a, like the clamping band 68 described above, has sterilizing fluid inlet and outlet tubes 73a and 80a connected thereto. Of course, the tube 73a is connected with a suitable source of sterilizing fluid. Clamping rings 122 and 124 are disposed for clamping the peripheral margins or radially extending flange portions of the diaphragms 50a and 116 against opposite sides of the gasket 68a. A suitable means such as C-clamps 126 and 128 may be used for holding the clamping rings, the gasket and the peripheral portions of the diaphragms in sealed relationship as shown in FIGS. 8 and 10.

After the closure members 42a and 110 are connected and sealed together, the opposing surfaces are sterilized in the manner described above in connection with the preceding embodiment. Then the diaphragms 50a and 116 may be slit for permitting transfer of items between the container or enclosure 56a to the enclosure 22a.

While the preferred embodiments of the present invention have been shown and described herein, it is obvious that many details may be changed without departing from the spirit and scope of the appended claims.

The invention is claimed as follows:

1. In an isolator structure having an enclosure including a port defining member, a closure member sealable to said port member, said closure member including a severable membrane, another enclosure positionable adjacent the first mentioned enclosure and having an opening, means including a second severable membrane closing said opening, means for securing said membranes in adjacent opposing relationship and for providing an annular seal around a space between said membranes, and said membranes being severable for permitting access between said enclosures while maintaining said enclosures sealed from the surrounding atmosphere.

2. An isolator structure, as defined in claim 1, wherein said second enclosure comprises a self-supporting container.

3. An isolator structure, as defined in claim 1, wherein said second enclosure is substantially identical to said first enclosure.

4. In an isolator structure comprising an enclosure having a port defining member, a closure member sealable to said port defining member, said closure member including a severable membrane, another enclosure positionable adjacent said first mentioned enclosure and having an opening, means including a second severable membrane closing said opening, means for securing said membranes in adjacent opposing relationship and for providing an annular seal around a space between said membranes and means connected with said space for introducing a decontaminating substance into said space, said membranes being severable for permitting access between the enclosures while maintaining said enclosures sealed from the surrounding atmosphere.

5. An isolator structure, as defined in claim 4, which includes means connected with said space for withdrawing the decontaminated substance from said space and for evacuating said space.

6. An isolator structure, as defined in claim 4, wherein said port defining member comprises an annular flange projecting generally axially inwardly with respect to said first mentioned enclosure, said closure member comprising an annular marginal portion extending over and around said annular flange and releasably sealed thereto.

7. An isolator structure, as defined in claim 4, wherein said membrane of said closure member includes an annular marginal portion, said means for securing said membranes in adjacent opposing relationship and for providing a seal which includes an annular member positioned against said second membrane and said annular section of said first mentioned membrane and said means for introducing a decontaminating substance includes a passageway through said annular member, and means releasably clamping said annular section of the membrane to said annular member.

8. An isolator structure, as defined in claim 7, wherein said annular section of said membrane extends around and is clamped against a radially outwardly facing surface of said annular member.

9. An isolator structure, as defined in claim 7, wherein said annular member presents axially oppositely facing surfaces, said second membrane also including an annular peripheral section, said annular peripheral sections of said membranes engaging said oppositely facing surfaces of said annular member, said isolator structure also including first and second clamping rings respectively engaging and retaining said annular membrane sections against the opposite sides of said annular member, and means releasably securing said clamping rings together.

10. An isolator structure, as defined in claim 4, wherein said second mentioned enclosure also includes a port member defining said opening, and said second mentioned diaphragm comprises a portion of a closure member substantially identical to the first mentioned closure member and sealable to said second mentioned port member.

11. An isolator structure, as defined in claim 10, wherein said port members respectively include axially projecting annular flanges extending inwardly of their associated enclosures, and said closure members respectively include tubular sheet material body portions having inner end marginal sections folded over said flanges of their associated port members.

12. In an isolator structure of the type described having an annular port member defining an access opening and having an annular inwardly facing margin, a closure member for closing said port and including a tubular sheet material body having an annular marginal section at one end thereof adapted to extend through said opening and to be folded around said inwardly facing margin of said port member and sealed thereto, and a diaphragm sealed to and closing an opposite end of said body member, said diaphragm including a free annular section projecting from said body member, said free annular section being connectable with means combining with the diaphragm to define a space into which a decontaminating substance may be introduced for decontaminating an outwardly facing surface of the diaphragm.

13. A method of establishing communication between first and second sealed enclosures while preventing contamination of the interior of the enclosure comprising the steps of initially closing an access opening in each enclosure with means including a severable diaphragm, thereafter positioning asid diaphragms in closely adjacent opposing relationship and sealing peripheral portions of said diaphragms with respect to each other and thereby providing a sealed space between the diaphragms, thereafter introducing a decontaminating substance into said space and decontaminating the opposing surfaces of said diaphragms, and subsequently severing said diaphragms and providing access between the enclosures.

References Cited

UNITED STATES PATENTS 3,051,164    8/1962    Trexler _____ 312—1

DAVID J. WILLIAMOWSKY, *Primary Examiner*,

J. L. KOHNEN, *Assistant Examiner*,